US007191769B2

(12) United States Patent
Raab et al.

(10) Patent No.: US 7,191,769 B2
(45) Date of Patent: Mar. 20, 2007

(54) INTERNAL COMBUSTION ENGINE HAVING TWO-STAGE EXHAUST-DRIVEN SUPERCHARGER AND CHARGE AIR COOLING BETWEEN LOW PRESSURE AND HIGH PRESSURE COMPRESSORS

(75) Inventors: Gottfried Raab, Perg (AT); Peter Kislinger, Linz (AT); Heinz Povolny, Losenstein (AT)

(73) Assignee: Man Steyr AG (DE)

( * ) Notice: Subject to any disclaimer, the term of this patent is extended or adjusted under 35 U.S.C. 154(b) by 0 days.

(21) Appl. No.: 10/913,139

(22) Filed: Aug. 5, 2004

(65) Prior Publication Data

US 2005/0081522 A1    Apr. 21, 2005

(30) Foreign Application Priority Data

Aug. 5, 2003    (AT)    .............................. A1238/2003

(51) Int. Cl.
*F02B 33/00*    (2006.01)
*F02B 29/04*    (2006.01)
*F02B 33/44*    (2006.01)
*F28D 7/10*    (2006.01)
*F28F 9/02*    (2006.01)
*F28F 7/00*    (2006.01)

(52) U.S. Cl. .......................... 123/563; 60/559; 60/612; 165/157; 165/158; 165/79

(58) Field of Classification Search ................. 60/612, 60/599; 123/563; 165/157–158, 140–141, 165/174–175, 79; 415/179
See application file for complete search history.

(56) References Cited

U.S. PATENT DOCUMENTS 2,270,864 A * 1/1942 Blais .......................... 165/175

| 2,327,491 | A | * | 8/1943 | Blais | 165/144 |
| 2,335,687 | A | * | 11/1943 | Modine | 165/174 |
| 2,650,073 | A | * | 8/1953 | Holm | 165/140 |
| 2,925,954 | A | * | 2/1960 | Spillmann et al. | 415/179 |
| 3,134,536 | A | * | 5/1964 | Adams | 415/179 |
| 3,727,681 | A | * | 4/1973 | Fernandes | 165/158 |
| 4,125,345 | A | * | 11/1978 | Yoshinaga et al. | 417/243 |
| 4,215,743 | A | * | 8/1980 | Margittai | 165/141 |
| 4,785,788 | A | * | 11/1988 | Targa Pascual | 123/563 |

(Continued)

FOREIGN PATENT DOCUMENTS

DE    19961610 A1 *  4/2001

(Continued)

*Primary Examiner*—Thai-Ba Trieu
(74) *Attorney, Agent, or Firm*—Robert W Becker & Associates; Robert W Becker

(57) ABSTRACT

An internal combustion engine with a 2-stage charge loading includes a connection conduit with a supercharger intercooler provided between the compressors of the low pressure stage and high pressure stage. The supercharger intercooler is configured via a cooling unit in the charge air guiding connection conduit between the compressor of the ATL-low pressure stage and the compressor of the ATL-high pressure stage having a cooling medium flowing therethrough as well as by a specially configured section of the connection conduit. The connection conduit in this section forms with its wall the outer wall of the supercharger intercooler and delimits an air through-put volume sufficient to effect, via a cooling medium flowing through the cooling unit, an acceptable cooling of charge air flowing through the cooling unit that is built into the connection conduit.

5 Claims, 3 Drawing Sheets

U.S. PATENT DOCUMENTS

| | | | | |
|---|---|---|---|---|
| RE33,528 E | * | 1/1991 | Doty | 165/158 |
| 5,400,854 A | * | 3/1995 | Iio et al. | 165/157 |
| 6,082,439 A | * | 7/2000 | Kato et al. | 165/79 |
| 6,805,108 B2 | * | 10/2004 | Shaffer et al. | 123/563 |
| 6,929,056 B2 | * | 8/2005 | Meshenky et al. | 165/176 |
| 2005/0081834 A1 | * | 4/2005 | Perkins | 123/563 |

FOREIGN PATENT DOCUMENTS

| JP | 60101223 A | * | 6/1985 |
|---|---|---|---|
| JP | 2005273944 A | * | 10/2005 |

* cited by examiner

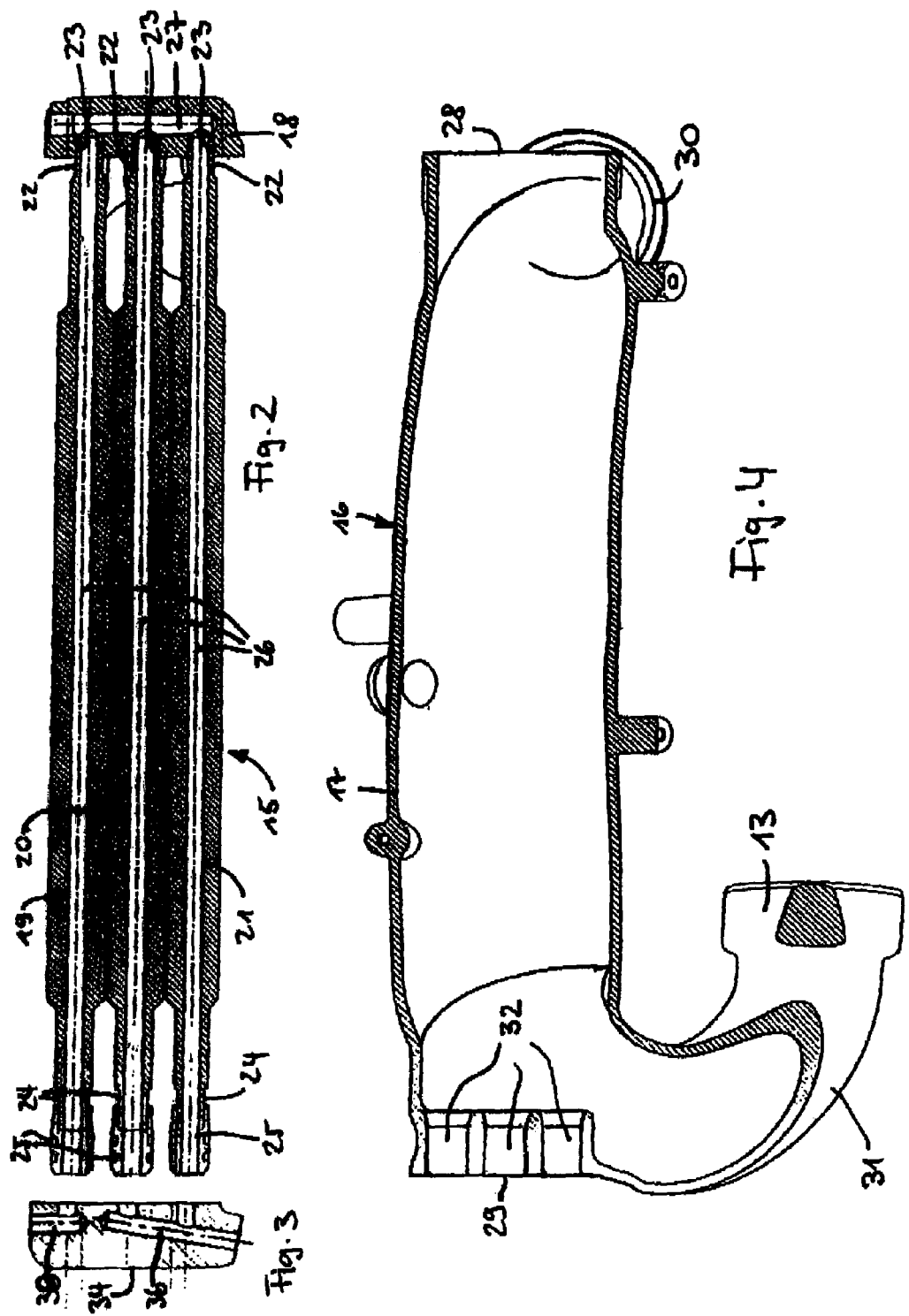

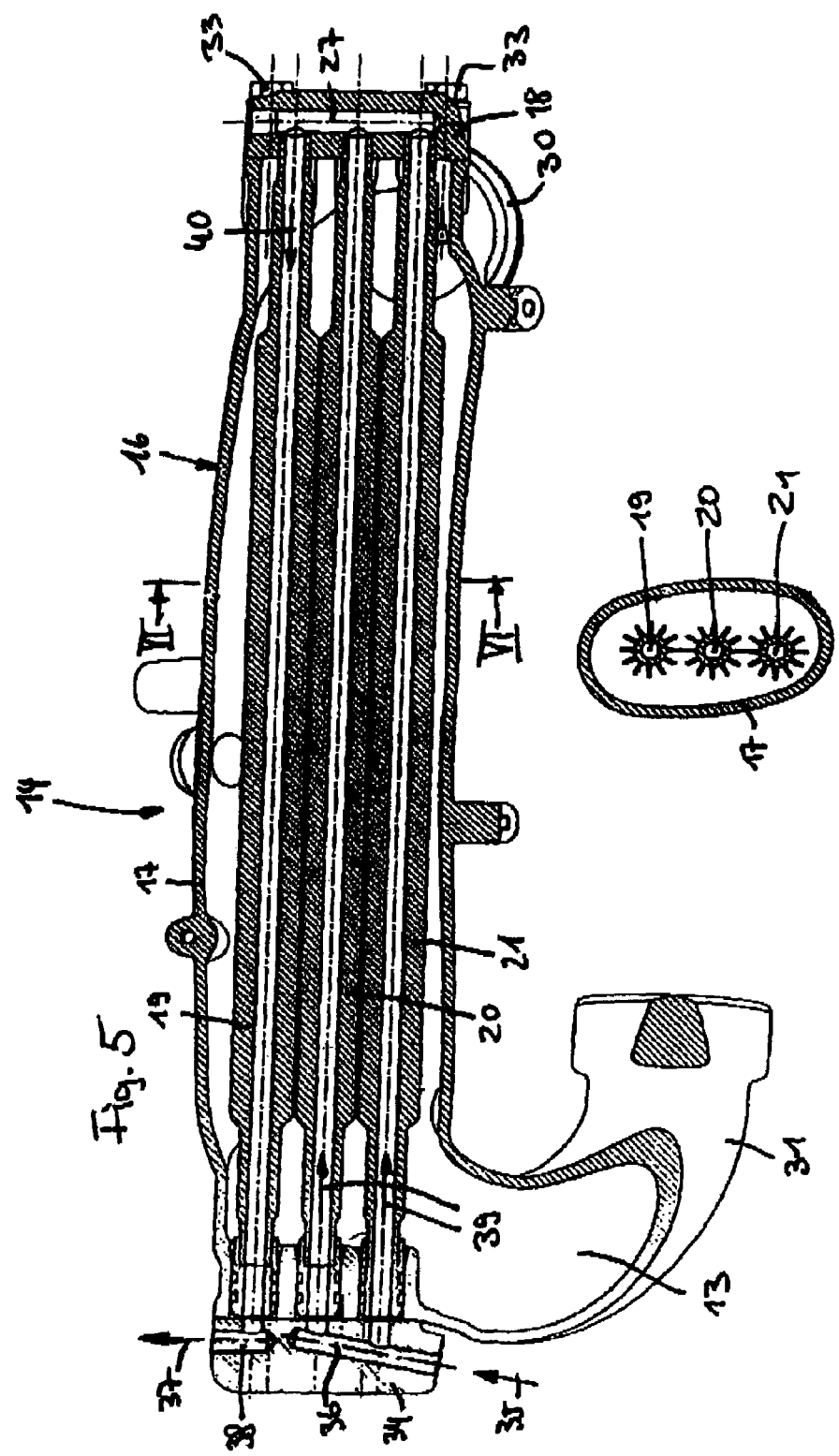

INTERNAL COMBUSTION ENGINE HAVING TWO-STAGE EXHAUST-DRIVEN SUPERCHARGER AND CHARGE AIR COOLING BETWEEN LOW PRESSURE AND HIGH PRESSURE COMPRESSORS

BACKGROUND OF THE INVENTION

The invention relates to an internal combustion engine with a 2-stage exhaust gas turbo loader and with a supercharger intercooler in the connection conduit between the compressor of the low pressure stage and the compressor of the high pressure stage.

An internal combustion engine with such features is known, for example, from DE 19961610 A1. With regard to this disclosure, a supercharger intercooler is, in fact, provided between the compressor of the low pressure stage and that of the high pressure stage; however, it remains open how this supercharger intercooler is configured.

It is therefore the object of this invention to provide a supercharger intercooler that takes into account the space-constrained relationships in the internal combustion engine between the low pressure- and high pressure-compressors.

SUMMARY OF THE INVENTION

The inventive supercharger intercooler is characterized via extremely small but nonetheless effective configurations. In view of the fact that the cooling unit can be built in in the manner of a cartridge in a specially configured section of the connection conduit between the ATL-low pressure compressor and the ATL-high pressure compressor and this section of the connection conduit forms the outer wall of the supercharger intercooler, a simple manufacturing of this component is, on the one hand, possible and, on the other hand, a simple mounting of this same component between the pair of ATL-stages is possible. A sufficiently large cooling effect is thus achieved, because the cooling pipes are provided exteriorly with a plurality of cooling ribs that operate to effect a corresponding heat exchange.

BRIEF DESCRIPTION OF THE DRAWINGS

The inventive supercharger intercooler is described in more detail hereinafter with reference to an embodiment illustrated in the drawings. The drawings show.

DESCRIPTION OF SPECIFIC EMBODIMENTS

Figure 1:
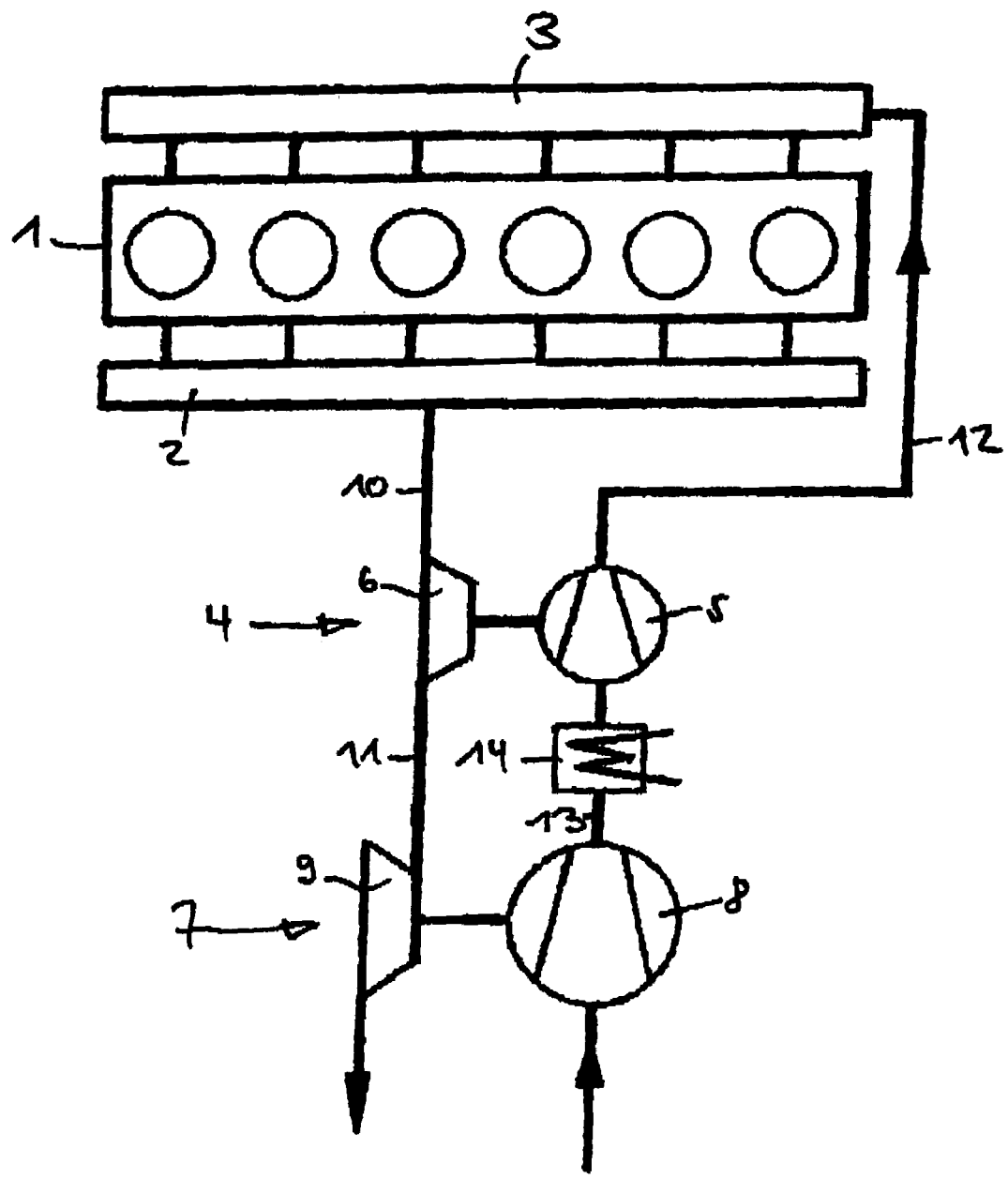
FIG. 1 diagrammatic view of an internal combustion machine with a 2-stage charger and supercharger or charge air cooling between the low pressure- and high pressure-stages, FIG. 2 a sectional view of an embodiment for an inventive cooling unit, FIG. 3 a cover belonging to the embodiment shown in FIG. 2, FIG. 4 an embodiment of a connection conduit section, between both compressors of the ATL-stages, that is a portion of the inventive supercharger intercooler, FIG. 5 an embodiment of the inventive supercharger intercooler in connection with the deployment of the cooling unit according to FIG. 2, the cover according to FIG. 3, and the connection conduit section according to FIG. 4, FIG. 6 a cross-sectional view through the illustration of FIG. 5 along the thereat-delineated section line VI—VI.

In FIG. 1, a supercharged internal combustion engine is shown whose exhaust gas collector conduit that is connected with the outlet channels of the cylinder is designated with 2 and whose charge air collector conduit that is connected with the inlet channels of the cylinder is designated with 3. The internal combustion engine 1 has a 2-stage exhaust gas turbo charger arranged relative thereto whose high pressure stage 4 comprises a turbine 6 that drives a compressor 5 and whose low pressure stage 7 comprises a turbine 9 that drives a compressor 8. The turbine 6 of the high pressure stage 4 is connected via an exhaust gas channel 10 with the exhaust gas collector conduit 2 and is connected via a connection channel 11 with the turbine 9 of the low pressure stage 7. The compressor 5 of the high pressure stage 4 is connected via a charge air conduit 12 with the charge air collector conduit 3 and is connected via a connection channel 13 with the compressor 8 of the low pressure stage 7. A supercharger intercooler 14 is provided in the connection conduit 13. This supercharger intercooler 14 is configured in accordance with the invention and as hereinafter further described.

In accordance with the invention, the supercharger intercooler 14 is configured—see FIG. 2—via a cooling unit 15 having a cooling medium flowing therethrough in the charge air guiding connection conduit 13 and a specially configured section 16 of the connection conduit 13—see FIG. 3, 4—whereby the connection conduit 13 in this section 16 forms, via its wall 17, the outer wall of the supercharger intercooler 14 and, via corresponding shape-accommodating configuration thereof, delimits an air through-put volume sufficient to effect, via a cooling medium flowing through the cooling unit 15, an acceptable cooling of the charge air flowing through the cooling unit 15 that itself is built into the connection conduit.

As can be well seen in FIG. 2, the cooling unit 15 is configured in the manner of a pre-assembled cartridge. This cooling unit 15 is comprised of a base plate 18 and several, such as, for example, three, cooling pipes 19, 20, 21 provided exteriorly with a plurality of cooling ribs—see FIG. 6. In this connection, each cooling pipe 19, 20, 21 comprises on one end thereof a cylindrical band 22 by which the cooling pipe is installed on the base plate 18 perpendicularly thereto in a blind hole bore 23 of the base plate 18, the installation being effected, for example, via pressing in, welding in, or soldering in of the cooling pipe. Each cooling pipe 19, 20, 21 supports, at its other end on a cylindrical band 24, a sealing tube 25. Within the cooling unit 15, each cooling pipe 19, 20, 21 communicates via its inner bore 26 with a distribution channel 27 configured in the base plate 18.

The connection conduit 13 is comprised, in each section 16 forming the supercharger intercooler 14, of a substantially straight cooling pipe section 16 and two elbows 30, 31 each on a respective end region of the straight cooling pipe section and laterally deviating therefrom before the axial ends 28, 29 thereof. In this manner, the cooling unit 15, which is configured in the manner of a cartridge, is disposable during its final assembly through an open end 28 of the straight section 16 of the connection conduit 13 into the interior volume of the connection conduit, whereby the cooling unit is, via the sealing tubes 25 on the cooling pipes 19, 20, 21, inserted in a sealing manner into retaining bores 32 formed in the axial ends 29 of the section 16 that are oppositely disposed to the cooling pipes and, thereafter, is, via several bolts 33, secured with its base plate 18 on an axial end 28 in a leak-free manner. Thereafter, the straight section 16 of the connection conduit 13 is closed on its ends 29 neighboring the sealing tubes 25 via a securable cover 34 disposed thereat. This cover 34 comprises, internally, a distribution channel 36 that can be supplied from the exterior—see arrow 35—with cooling medium, the distribution channel being communicated with a portion of the cooling pipes—namely, the cooling pipes 20, 21. Furthermore, the cover 34 comprises, internally, a return flow channel 38 connected with an external cooling medium return conduit—designated via arrow 37, the other one remaining cooling pipe or the other remaining cooling pipes—here, namely, the one remaining cooling pipe 19—communicating with the return flow channel.

In the illustrated example, the inventive cooling unit 15 comprises three cooling pipes 19, 20, 21 arranged in a plane in parallel neighboring relationship to one another with limited spacing from one another and having the same length and configuration—see FIG. 6—whereby cooling medium is flowed through two of these (20, 21) in parallel in one direction—see arrow 39 in FIG. 5—and cooling medium is flowed through the third cooling pipe 19 in the other direction—see arrow 40—and quasi forms a cooling insert internal cooling medium-return conduit.

With its wall 17, the connection conduit 13 encloses within its straight channel section 16 the built in cooling unit 15 at a predetermined, not large spacing therefrom that is smaller than the outer diameter of the cooling pipes 19, 20, 21.

Via this inventive supercharger intercooler 14, an adequate cooling effect is achieved, despite the very small size of the supercharger intercooler, by virtue of the intensive flow through the cooling pipes 19, 20, 21 of the cooling medium and the inner contact of the charge air, which flows through the cooling unit 15 in the connection channel-section 16, with the cooling ribs of the cooling pipes 19, 20, 21.

The specification incorporates by reference the disclosure of Austrian priority document A 1238/2003 filed Aug. 5, 2003.

The present invention is, of course, in no way restricted to the specific disclosure of the specification and drawings, but also encompasses any modifications within the scope of the appended claims.

The invention claimed is:

1. An internal combustion engine with a two-stage exhaust gas turbocharger having a low pressure stage and a high pressure stage, the combustion engine comprising:
   a connection duct disposed between a compressor of the low pressure stage and a compressor of the high pressure stage;
   a charge air intercooler comprising a section of the connection duct and a cooling insert positioned in the section of the connection duct, wherein a coolant flows through the cooling insert;
   wherein a wall of the section of the connection duct forms a housing part of the charge air intercooler and defines a flow rate volume that is sufficient for effectively cooling charge air while flowing in the section of the connection duct around the cooling insert;
   wherein the section of the connection duct is formed as a substantially straight intercooler area that is open at at least one first axial end and has laterally deviating elbows on respective end regions or each axial end for supplying or conducting away the charge air, and
   wherein the cooling insert is configured as a pre-assembled cartridge comprising a base plate and a plurality of cooling pipes provided exteriorly with a plurality of cooling ribs, wherein the cooling pipes fit into bores formed in the base plate and communicate with a coolant distribution channel configured in the base plate.

2. The internal combustion engine of claim 1, wherein each cooling pipe of said cartridge is provided with a cylindrical band at one end, wherein each of said cooling pipes is installed by pressing, welding, or soldering with said band into a blind-hole bore in said base plate in a position perpendicular to said base plate, and wherein each cooling pipe, at another end, is provided with a sealing sleeve on a cylindrical band, wherein each cooling pipe communicates with a respective inner bore with the coolant distribution channel in the base plate.

3. The internal combustion engine of claim 1, wherein the cartridge is insertable into an interior of the section of the connection duct through the at least one first axial end that is open and with the sealing sleeves on the cooling pipes, protrudes into holding bores provide at a second, opposite axial end of the section of the connection duct, wherein the cartridge, with its base plate, can be detachably flanged onto the at least one first axial end in a leakage-free manner, and wherein the second, opposite axial end of the section of the connection duct is closed by a cover fastened to said second, opposite axial end, wherein said second, opposite axial end is adjacent to the sealing sleeves, and wherein said cover is provided internally with a coolant distribution duct that is supplied externally with a coolant and communicates with a first portion of the cooling pipes, wherein said cover further includes a return duct connected with an external coolant return pipe that communicates with a second portion of the cooling pipes.

4. The internal combustion engine of claim 3, wherein the cooling insert formed as a cartridge includes three cooling pipes arranged parallel to one another in one plane and having the same length and structure, wherein coolant flows through two of said three cooling pipes parallel in a first direction and wherein in one of said three cooling pipes, coolant flows in a second, opposite direction and forms a quasi-cooling-insert-internal return pipe for the coolant.

5. The internal combustion engine of claim 3, wherein the wall of the section of the connection duct surrounds the cooling insert at a distance that is smaller than a diameter of the cooling pipes.

* * * * *